United States Patent [19]

Savary

[11] Patent Number: 4,816,206

[45] Date of Patent: Mar. 28, 1989

[54] NUCLEAR REACTOR CONTROL BAR DRIVE DEVICE

[75] Inventor: Fernand Savary, Saint Leu La Foret, France

[73] Assignee: Framatome, Courbevoie, France

[21] Appl. No.: 66,434

[22] Filed: Jun. 26, 1987

[30] Foreign Application Priority Data

Jun. 27, 1986 [FR] France ............................. 8609385

[51] Int. Cl.⁴ .............................................. G21C 7/06
[52] U.S. Cl. .................................................. 376/228
[58] Field of Search ....................... 376/219, 228, 243

[56] References Cited

U.S. PATENT DOCUMENTS 3,940,311  2/1976  Frisch et al. .
4,696,783  9/1987  Lesauliner et al. ................. 376/228

FOREIGN PATENT DOCUMENTS 1911057  8/1970  Fed. Rep. of Germany .
1951418  4/1971  Fed. Rep. of Germany .

Primary Examiner—Harold J. Tudor
Assistant Examiner—Richard Klein
Attorney, Agent, or Firm—Pollock, Vande Sande & Priddy

[57] ABSTRACT

A nuclear reactor control bar drive device with mobile valve is provided, comprising a cluster guide placed above the core, a casing containing a drive mechanism connected to the inside of the reactor by a sheath passing sealingly through the lid of a vessel containing the core, a control shaft movable vertically in the sheath, connecting the mechanism to the bar and passing, with radial clearance, through an upper plate for closing the guide, as well as a thermal protection sleeve interposed radially between the shaft and the sheath and able to bear by an end piece on said upper plate. The sleeve is pierced, below the sheath, with a calibrated passage for intake of fluid into the guide through the clearance and a non return valve is disposed between the sleeve and the sheath, is movable vertically with respect thereto and co-operates with a seat of the sheath for allowing the fluid to flow only towards the drive mechanism.

7 Claims, 1 Drawing Sheet

U.S. Patent    Mar. 28, 1989    4,816,206
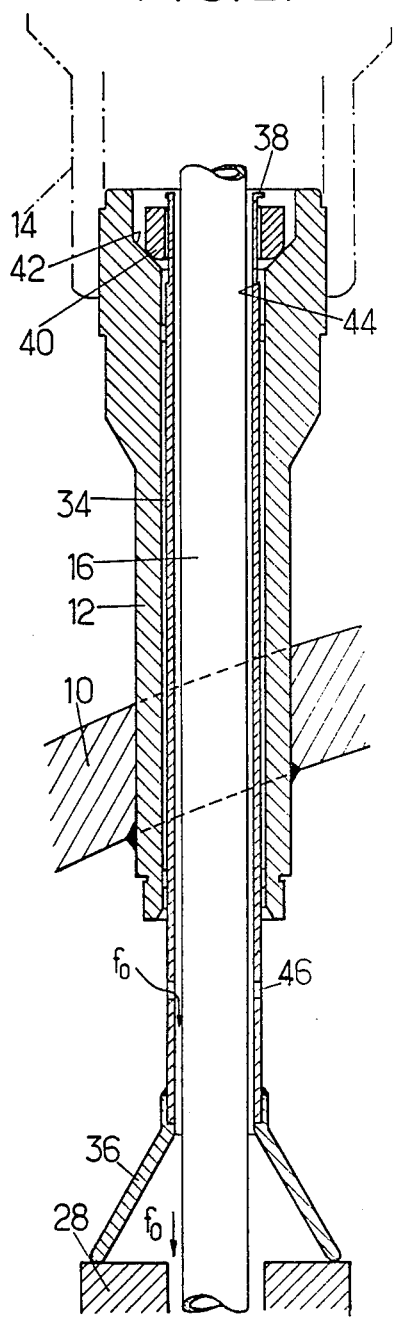
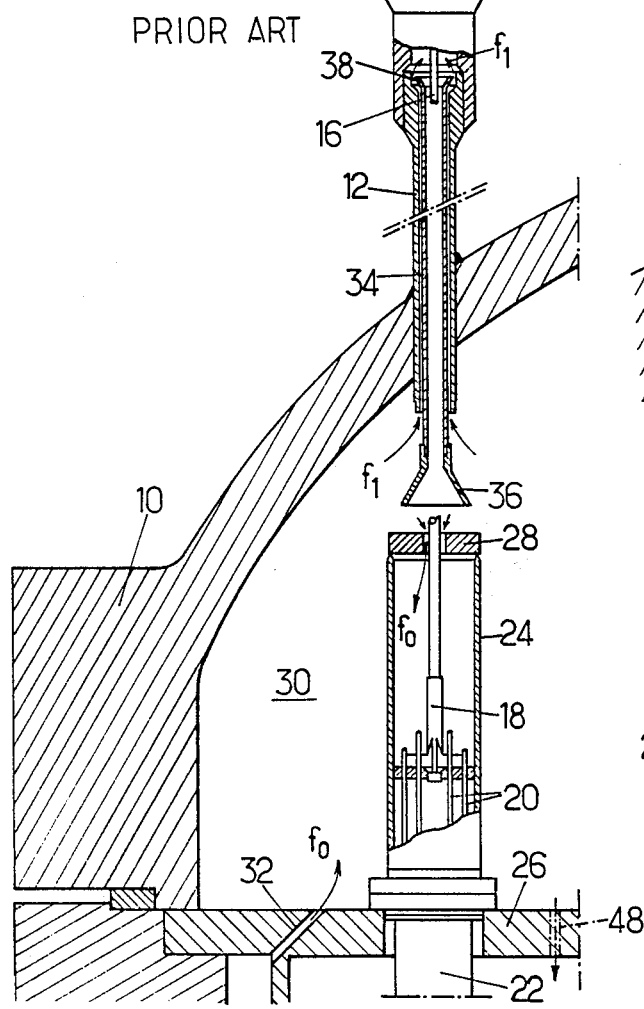

NUCLEAR REACTOR CONTROL BAR DRIVE DEVICE

BACKGROUND OF THE INVENTION

FIELD OF THE ART

The invention relates to a control bar drive device for a nuclear reactor cooled by a pressurized fluid, of the type having a control bar guide placed above the reactor core, a casing containing a drive mechanism and connected to the inside of a reactor vessel by a sheath passing sealingly through a lid of the vessel containing the reactor core, a drive shaft movable vertically within and along the sheath, connecting the mechanism to the bar and passing, with a radial clearance, through an upper closure plate of the guide, a heat protection sleeve being interposed radially between the shaft and the sheath and having an end piece co-operating with said upper plate for controlling a coolant flow.

PRIOR ART

Devices of the above-defined type are already provided in pressurized water nuclear reactors, including some of PWRs constructed by the assignee of the present invention. FIG. 1 shows by way of example such a device for a PWR nuclear reactor having a vessel closed by an upper lid 10. Each device includes a sheath 12 secured to and projecting sealingly through the lid 10, opening at the bottom into the vessel and at the top into a casing 14 containing a control bar drive mechanism. This mechanism, for example of well known electro-mechanical type, is connected to a shaft 16 connectable to the pommel or head 18 of the control bar which includes a cluster of rods 20 containing neutron absorbant material. The cluster is axially guided in its longitudinal movements by a lower guide 22 and a guide tube 24. Guide 22 and guide tube 24, placed in alignment with each other, are fixed to an upper plate 26 carried by the vessel and belonging to the upper internal equipment of the reactor. The guide tube 24 is closed at its upper end by a plate 28 in which is formed an opening through which the shaft 16 projects. The opening leaves an appreciable clearance (in practice of the order of 7 mm around the shaft) which is required for satisfactory mechanical operation.

In such a reactor of PWR type, the light water forming the coolant and moderator flows through the core upwardly to remove the heat supplied by the fuel. It leaves the vessel through a lateral pipe (not shown) situated at about the same horizontal level as the cluster guides 22. Plate 26 separates the space in which the coolant changes direction so as to flow out through the outlet pipe from another space 30, sometimes named "vessel roof", situated immediately under the lid. As shown in FIG. 1, the vessel roof is kept under a slight overpressure with respect to the space situated below plate 26, for example by water flowing from a zone communicating with the inlet pipe upstream of the core, through passage 32 formed in plate 26. Due to the overpressure in the vessel roof 30, water flows toward the space situated below plate 26 and short circuits the core along the path shown by arrows f0. This flow through the cluster guides 24 tends to cause vibrations of the control shafts of the clusters and causes wear of the rod sheaths due to contact with the conventional transverse guide plates provided in guide 22. This non-controllable flow tends to decrease the thermal efficiency of the reactor. It is not possible to reduce it by decreasing the clearance of shaft 16 in plate 28 beyond a certain limit, due to mechanical requirements.

In addition, the vessel roof tends to be subjected to coolant currents towards the casing 14. These currents, caused by a thermosiphon effect, increase the heat losses from the mechanism casings to atmosphere.

To reduce the heat losses and protect the sheath 12 passing through the lid, it has already been proposed to place a heat protection sleeve 34 between sheath 12 and the control shaft 16. The sleeve is movable axially between a higher position in which it is shown in FIG. 1 and a lower position in which an upper collar 38 thereof bears on a seat provided at the outlet of casing 14. In the latter position, a lower cup-shaped end piece 36 of sleeve 34 is in close proximity to plate 28. Upon bar fall, the depression created at the upper part of casing 14 by the fall of shaft 16 raises the sleeve and opens a passage through which water can flow for balancing the pressures, along the path shown by arrows f1.

This solution is not fully satisfactory. Free fall of the bar is delayed until the depression in casing 14 has reached a sufficient value for counter-balancing the weight of sleeve 34. The thermal convection currents inside the cluster control mechanism remain anarchic and depend on local overheating.

It has also been suggested to locate valve means with the tubular drive shaft of a control bar to close flow openings in the shaft upon backward movement of the shaft (German No. 1,951,418). That arrangement does not overcome the above deficiencies.

SUMMARY OF THE INVENTION

It is an object of the invention to provide a control bar drive device; it is more specific object to provide a device having reduced convection heat losses without delaying the fall of the bars upon scram. It is a further object to reduce the water flow in the cluster guides and the vibrations which it generates to the minimum amount required for cooling the control rod clusters.

To this end, there is provided a device of the above-defined type whose sleeve is arranged for contact with the upper plate and formed with calibrated means located below the sheath for entrance of cooling fluid which flows into the guide through the clearance, a non-return valve being disposed between the sleeve and the sheath movable vertically with respect thereto. The valve may have a slidable valve member co-operating with a seat of the sheath so as to allow the fluid to flow only towards the drive mechanism.

With this arrangement, the bottom of the mechanism casing is much more quickly communicated with the vessel roof upon rod cluster fall, for the weight of the valve represents a very small function of the weight of the sleeve. The flow which short-circuits the core may be readily adjusted by modifying the cross-sectional area of the passage and that helps in balancing flow between the different devices. The flow rate caused by thermo-siphon effect in the mechanism is considerably reduced, as well as the heat losses which result therefrom.

The passage may be formed as one or more inlet openings formed in the sleeve, above the end piece. The cooling water flowing towards the space situated below the upper plate forms a barrier for the thermal convection currents which tend to flow towards the mechanism. With the flow along fo thus regulated, it is possible to adjust the flow rate which short-cirucits the core by providing a series of calibrated openings in the upper plate. One advantage of this bypass flow complement is that the water content of the vessel roof may be used for cooling the core in the case of failure of the primary circuit, for instance due to a LOCA.

The invention will be better understood from the following description of a particular embodiment given by way of example. The description refers to the accompanying drawings.

BRIEF DESCRIPTION OF THE DRAWINGS

FIG. 1, already mentioned, is a front view in partial section of a prior art control bar drive device;

FIG. 2 is an enlarged view of the part concerned by the invention of a control bar drive device, shown in section through a vertical plane passing through its axis.

DETAILED DESCRIPTION OF A PREFERRED EMBODIMENT

The device of the invention may have a general construction similar to that shown in FIG. 1 and the corresponding elements of FIGS. 1 and 2 are consequently designated by the same reference number.

Unlike that shown in FIG. 1, the thermal sleeve 34 of the device of FIG. 2 is so arranged that its cup-shaped end piece 36 bears at rest on the plate 28 of the guide tube. Its upper part is formed with a collar 38 which acts only as a stop limiting the upward travel of a valve closure member 40. Valve member 40 has a downwardly facing surface of generally toroidal shape for bearing on a frustoconical seat 42 formed on sheath 12 or on the low part of casing 14.

The weight of valve member 40 tends to apply it substantially sealingly on seat 42. Its upward movement with respect to sleeve 34 is limited by abutment against collar 38. Sleeve 34 may include an upwardly directed shoulder 44 for lifting valve member 40 from its seat if the amount of upward movement of the sleeve from its rest position exceeds a predetermined value.

Passage means are formed in sleeve 34 below the sheath 12. The passage means may be in the form of a plurality of calibrated openings 46 allowing water to pass from the vessel roof 30 to the lower guide 22. Since there is no free space between the cup-shaped end piece 36 and the closure plate 28 due to their abutting engagement, the flow which short-circuits the core may be adjusted to a suitable value and may be balanced between the different bar drive devices.

When a bar is being raised or is held in position by the mechanism, the valve 40-42 is closed and suppresses convection currents flowing through the annular gap between sheath 12 and thermal sleeve 34 which would otherwise be caused to thermosiphon effect. The abutment of the end piece 36 on plate 26 and the presence of openings 46 result in an inflow of water which tends to prevent high temperature water from rising towards casing 14 and thus reduces the heat losses.

Upon bar release and fall, valve member 40 opens practically instantaneously as soon as a depression appears above the drive shaft 16. Water coming from the vessel roof may thus flow towards the mechanism without an appreciable head loss which would delay the fall of the bar. The end piece 36 is so arranged that it moves up as soon as the pressure difference across the thermal sleeve results in a rising force exceeding its weight, further facilitating the fall of the bar.

The reduction of the short-circuit flow rendered possible by the invention tends to reduce core cooling in the case of a failure of the primary circuit. To overcome this consequence, which however only exists under exceptional conditions, a plurality of calibrated passages 48 may be provided through the upper plate 26. One such passage is shown in dashed line in FIG. 1: then the water contained in the vessel roof 30 may penetrate into the core should a breakage of the primary circuit occur, causing a loss of primary coolant.

The invention is not limited to the particular embodiment which has been shown and described by way of example. The device is also applicable to control bars which are not for fine control but are of another nature for instance for flux flattening or neutron energy spectrum variation.

I claim:

1. In a nuclear reactor cooled by a pressurized fluid and having a pressure vessel containing a core and closed by a lid,
   a control bar driven device comprising:
   a control bar guide placed above the core and supported by said vessel;
   an upper closure plate for said guide, having a central opening;
   a casing containing a drive mechanism and connected to a sheath projecting sealingly through and secured to the lid of the vessel, said sheath opening into the vessel above said guide;
   a drive shaft vertically movable within and along the sheath, connecting the mechanism to a control bar and projecting with a radial clearance through said opening of said upper closure plate of the guide;
   a vertically movable thermal protection sleeve interposed radially between said shaft and said sheath and having an end piece arranged to bear on said upper plate around said opening, said sleeve being formed with calibrated passage means located at a level below the sheath and arranged for flow of said pressurized fluid into the guide through the clearance; and
   non-return check valve means between the sleeve and the sheath for allowing fluid flow to the drive mechanism through a passage between said thermal protection sleeve and said sheath while preventing fluid flow from said drive mechanism to said vessel.

2. A device according to claim 1, wherein said valve means includes an annular valve closure member slidable along said thermal sleeve and arranged to move vertically down toward and up away from a seat formed on said sheath under said valve closure member.

3. A device according to claim 1, wherein the passage means consists of at least one inlet hole formed in the sleeve above the end piece.

4. A device according to claim 2, wherein the sleeve includes stop means for limiting the travel of the valve closure member away from its seat.

5. A device according to claim 2, wherein the sleeve is provided with a shoulder for forcibly lifting the valve closure member clear from said seat when the extent of movement of the sleeve from a position where its end piece is in abutment against the upper plate exceeds a predetermined value.

6. A device according to claim 1, wherein said guide is secured in a lower portion thereof to a support plate supported by said vessel and said support plate is formed with passages for communicating the core with a volume situated above said support plate.

7. In a pressurized water reactor having a pressure vessel, a lid closing said vessel, a reactor core within said vessel and upper internals including a support plate located above said core and carried by said vessel,
- a drive device for moving a cluster of control rods vertically into and out of the core, comprising:
- a control cluster guide having a lower portion secured to said support plate and terminating upwardly at a distance from said lid;
- an upper closure plate for said guide, having a central opening;
- a casing containing a drive mechanism and connected to a sheath projecting sealingly through and secured to the lid of the vessel, said sheath opening into the vessel above said upper closure plate;
- a drive shaft vertically movable within and along the sheath, connecting the mechanism to a control bar and projecting with a radial clearance through said opening of said upper closure plate of the cluster guide;
- a vertically movable thermal protection sleeve interposed radially between said shaft and said sheath and having an end piece arranged to be moved into abutment on said upper closure plate around said opening by gravity, said sleeve being formed with calibrated passage means located at a level below the sheath for flow of pressurized water into the guide through the clearance; and
- non-return valve means having a closure member located between the sleeve and the sheath and gravity biased toward a seat on said sheath for allowing fluid flow to the casing while preventing fluid flow from said casing to said vessel.

* * * * *